Patented Nov. 27, 1934

1,981,927

UNITED STATES PATENT OFFICE 1,981,927

BEARING METAL ALLOY

Alfred W. Schluchter, Dearborn, Mich., assignor, by mesne assignments, to General Motors Corporation, Detroit, Mich., a corporation of Delaware No Drawing. Application November 12, 1932, Serial No. 642,462

4 Claims. (Cl. 75—1)

My invention relates to alloys used, principally, for making crank shaft and crank pin bearings for internal combustion and similar engines, and which alloys are composed of copper and lead, although a small amount of tin or other metal such as silver or cadmium may enter into their composition. Such alloys having a composition around 70% copper and 30% lead are commonly called "plastic bronzes"; and bearings made from them give particular good service in aeroplane engines when run on hardened steel journals. Such bearings are durable beyond those made from other alloys, they are soft to a degree that scoring of the journals of the hardened steel crank shaft is much reduced, and their general qualities are such that they have to a large degree displaced ordinary bronze, babbitt, white metal, and other alloys heretofore used in the making of bearings for aeroplane engines. This type of copper-lead bearing, however, has been found to produce an undesirable amount of scoring when used in connection with soft steel journals of the hardness usually found in automobile engine crank shafts and when run at the high crank shaft rotational speeds around 4000 R. P. M. such as encountered in automobile engines.

The object of my invention is to provide an alloy or mixture of the plastic bronze type above mentioned which, when used in the making of bearings as contemplated, will result in bearings of better quality than has heretofore been the case so that these bearings may be run in contact with a soft steel journal rotating at speeds as high as 4000 R. P. M. and above without scoring said journal. I have found that the combination of a high lead content between 40 and 50% lead, treated while molten with a small amount of calcium, results in a bearing material which will run on a soft steel journal without scoring it. I have found also that uniform freedom from scoring is not obtained by merely increasing the lead content to some quantity in the neighborhood of 40 to 50%, but that it is necessary also to add the calcium which presumably changes the character of hard metallic oxides by combining with them. Too high a lead content, however, results in a bearing which is more yieldable, and which has more of a tendency to distort and flow in use than is desirable; so that, and as the result of extensive experimentation, I have fixed upon 45% lead, that is an alloy or mixture containing copper 55% and lead 45%, as the best one which I have thus far investigated; although I have secured uniformly good results with alloys containing from 40% to 50% lead and regard my invention as including mixtures within that range of the lead content.

Another advantage secured is that bearings made from a plastic bronze mixture containing calcium run cooler, and are less liable to seize or score the crank shaft and crank pin journals than those made from a mixture to which calcium has not been added in accordance with my invention. In experiments with bearings containing 45% lead, the temperature rose to 150 to 160° F. and remained uniform throughout a run of 150 hours duration with no signs of scoring, whereas in a substantial percentage of bearings of the same mixture, but to which calcium had not been added, the temperature rapidly increased to a temperature greatly in excess of 160° F. and destructive scoring occurred; the lubricant supply, load, speed, and other conditions being the same in both cases.

The amount of calcium added to the copper-lead mixture is small, on the order of 0.1% or less. In conducting experimental work I have added calcium in varying amounts up to 0.1% thereof to copper-lead mixtures with good results in all cases, but regard a calcium content of from .02% to .07% as the best to use.

The calcium is preferably added to the copper-lead mixture by melting the same in a suitable crucible, and then adding thereto a sufficient amount of copper-calcium or lead-calcium alloy to supply the requisite calcium to the mixture stirring, meanwhile, as will be understood; or making use of an induction furnace to heat the crucible whereby automatic stirring is secured. Such copper-calcium and lead-calcium alloys containing varying quantities, for example 10%, of metallic calcium are purchasable in the open market or may be readily made.

Having thus described and explained my invention I claim and desire to secure by Letters Patent:

1. A plastic bronze bearing metal having 40 to 50% lead, 60 to 50% copper, and calcium to the extent of less than 0.1%.

2. A plastic bronze bearing metal containing approximately 45% lead, 55% copper, and approximately 0.1% of calcium.

3. A plastic bronze bearing metal made up of approximately 45% of lead, approximately 55% of copper, and an alloy of copper and calcium or lead and calcium sufficient in amount to add approximately 0.1% of calcium to the bearing metal.

4. A plastic bronze bearing metal made up of 40 to 50% of lead, 60 to 50% of copper, and a lead-calcium alloy sufficient in amount to add approximately 0.1% of calcium to the bearing metal.

ALFRED W. SCHLUCHTER.